Aug. 25, 1964 CHIH-TANG SAH 3,146,135

FOUR LAYER SEMICONDUCTIVE DEVICE

Filed May 11, 1959 2 Sheets-Sheet 1

CHIH-TANG SAH
*INVENTOR.*

BY Flehr and Swain
ATTORNEYS

CHIH-TANG SAH
*INVENTOR.*

BY

Flehr and Swain
ATTORNEYS

United States Patent Office 3,146,135

Patented Aug. 25, 1964

3,146,135

FOUR LAYER SEMICONDUCTIVE DEVICE

Chih-tang Sah, Menlo Park, Calif., assignor, by mesne assignments, to Clevite Corporation, Cleveland, Ohio, a corporation of Ohio Filed May 11, 1959, Ser. No. 812,433
2 Claims. (Cl. 148—33.3)

This invention relates generally to a semiconductive device and method of manufacturing the same.

Semiconductive devices including four layers forming three junctions have been described in the prior art. The devices have two stable states: a low impedance high current state, and a high impedance low current state. The devices are switched into the high impedance low current state when the current falls below a predetermined value and are switched into the low impedance high current state when the applied voltage reaches a predetermined breakdown or switching level. One application of such devices is in bistable switching circuits.

One of the difficulties experienced in the fabrication of prior art four layer devices of the type described is that rapidly changing voltages applied across the same cause them to switch at voltages less than the switching or breakdown voltage. Furthermore, an increase in temperature causes rapid degradation of the breakdown voltage level.

The breakdown voltage and holding currents for devices of the character described is usually controlled by controlling the thickness, the sheet resistance, the impurity concentration of the various layers forming the device and the impurity gradients at the junctions. It becomes relatively difficult to construct devices having relatively low breakdown voltages with predetermined relatively low holding current characteristics due to the heavy doping and high impurity concentration gradients required. Another problem which arises is that ambient conditions effect the high voltage junctions and deteriorate the device's voltage characteristics.

It is a general object of the present invention to provide an improved semiconductive device and method of manufacturing the same.

It is another object of the present invention to provide a semiconductive device in which the breakdown or switching voltage is relatively independent of the rate of change of the applied voltage.

It is another object of the present invention to provide a four layer semiconductive device which includes a built-in avalanche diode serving to control the breakdown or switching voltage.

It is a further object of the present invention to provide a semiconductive device in which the breakdown or switching voltage can be controlled during manufacture within predetermined limits and in which the breakdown or switching voltage can be made relatively small.

It is another object of the present invention to provide a semiconductive device which has a relatively low breakdown voltage and holding current.

It is another object of the present invention to provide a semiconductive device whose characteristics are relatively immune to ambient conditions.

It is another object of the present invention to provide an improved method of manufacturing semiconductive devices.

These and other objects of the invention will become more clearly apparent from the following description when taken in conjunction with the accompanying drawing.

Referring to the drawing.

Figure 4:
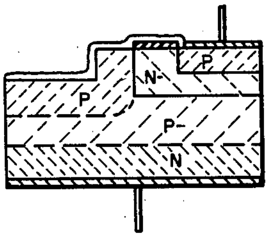
Figure 5:
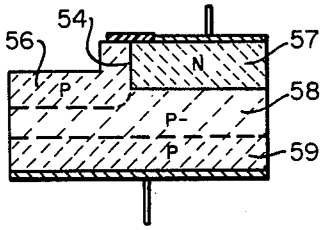
Figure 6:
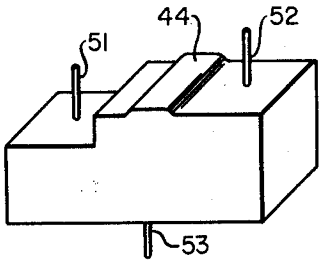
Figure 9:
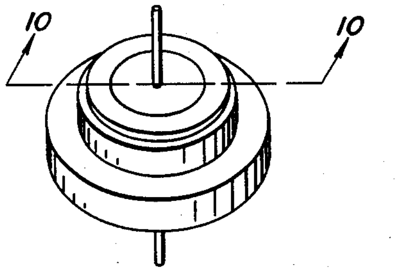
Figure 7:
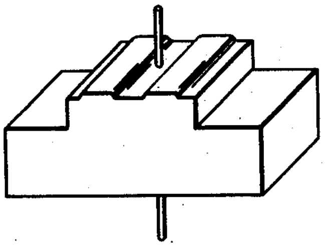
Figure 10:
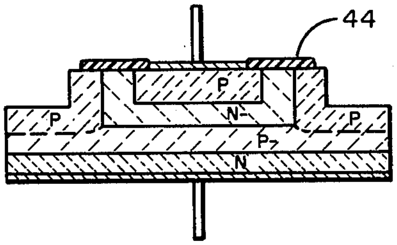
Figure 8:
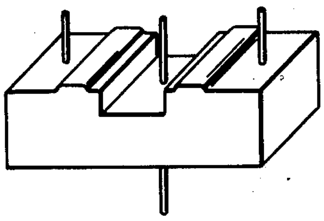

FIGURES 3A–I show the steps in manufacturing a four layer semiconductive device in accordance with the present invention;

FIGURE 4 shows a two terminal, four layer semiconductive device in accordance with the present invention;

FIGURE 5 shows a two terminal, two layer semiconductive device manufactured in accordance with the present invention;

FIGURE 6 is a perspective view showing one configuration of a semiconductive device in accordance with the present invention;

FIGURE 7 shows a semiconductive device in accordance with the present invention which is symmetrical about a line;

FIGURE 8 shows a semiconductive device in accordance with the present invention which is symmetrical about a line;

FIGURE 9 shows a semiconductive device in accordance with the present invention which is symmetrical about an axis; and FIGURE 10 is a sectional view taken along the line 10—10 of FIGURE 9.

Figures 1, 2, 3A, 3B, 3C, 3D, 3E, 3F, 3G, 3H, 3I:
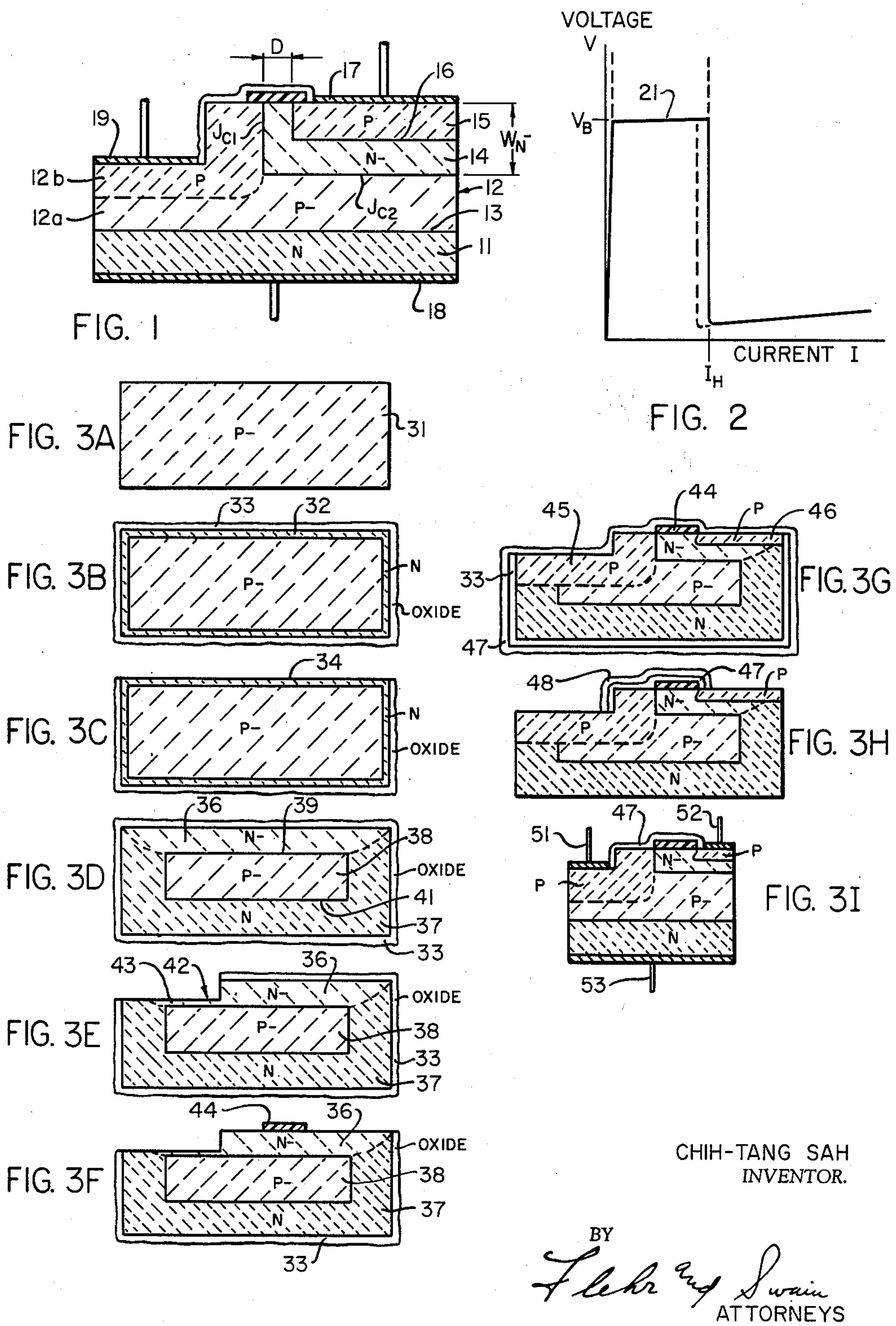
FIGURE 1 is a sectional view of a four layer, three terminal semiconductive device in accordance with the invention.
FIGURE 2 shows typical voltage-current characteristics for a semiconductive device of the type shown in FIGURE 1.

The semiconductive device illustrated in FIGURE 1 includes a first layer 11 of one conductivity type. A second layer 12 of opposite conductivity type forms a rectifying junction therewith. The second layer 12 includes a region of low impurity concentration **12*a* and a region of higher impurity concentration 12*b*. A third layer 14 of said one conductivity type includes a portion which forms a junction with the region of high impurity concentration 12*b* and another portion which forms a junction with the region of low impurity concentration 12*a*. There is formed a junction $J_{C1}$ which has a relatively high impurity concentration gradient and a junction $J_{C2}$ which has a relatively low impurity concentration gradient. A fourth layer 15 of opposite conductivity type forms a rectifying junction 16** with the third region.

In a two terminal device, ohmic contact 17 is formed with the region 15 and ohmic contact 18 is formed with the region 11. In certain instances it may be desirable to provide a control voltage to the layer 12. For this purpose, ohmic contact 19 may be made to the region **12*b***.

It is noted that the junction $J_{C2}$ has relatively low concentration gradient; thus, the breakdown voltage across this junction is relatively high. On the other hand, it is noted that the junction $J_{C1}$ has a relatively high impurity concentration gradient and the breakdown voltage for this junction is relatively low. Thus, the breakdown voltage for the four layer device is controlled by the concentration gradient of the junction $J_{C1}$. This is controlled by the impurity concentration of the region **12*b* of layer 12 and of layer 13**. It is sometimes preferable to outdiffuse slightly after the completion of the diffused slice so that the highest concentration gradient region of the junction $J_{C1}$ is beneath the surface and the breakdown current flows more uniformly over the entire area of the junction $J_{C1}$.

Referring to the voltage-current ditagram of FIGURE 2, the breakdown voltage $V_B$ is controlled by controlling the concentration gradient at the junction $J_{C1}$. It is observed that the curve 21 rises with increasing current. The amount of rise can be controlled by controlling the width D (FIGURE 1) of the N-layer 14 between the two P layers, or by controlling the impurity concentraton of the layer 14, or the width $W_{N-}$ (FIGURE 1). Alternatively and additionally, the diffused slice may be outdiffused in high vacuum so that the highest concentration gradient of junction $J_{C1}$ is moved inward from the surface to make the initial breakdown occur over a much larger junction area and thus less resistance (line 21) to the breakdown current can be obtained. In essence, the junction $J_{C1}$ acts as an avalanche diode breakdown at a voltage which is dependent upon the concentration gradient at this junction region.

As soon as the junction $J_{C1}$ breaks down and avalanche sets in, the breakdown current increases and spreads over the junction 16 and causes the alpha (current amplification ratio of the PN—P— transistor to increase. The junction $J_{C2}$ and the base layers 12*a* and 14 then play a predominant role in controlling the holding current $I_H$ and the characteristics of the device in the low impedance high current state (the on state). Turn-off of the device occurs at a current slightly less than the holding current $I_H$ as shown by the dotted line (FIGURE 2). The reason for slightly lower turn-off current is the fact that in the "on" condition most of the current flows in the region of low concentration gradient or high breakdown voltage. The magnitude of the current due to recombination in the space charge layer is proportional to the space charge layer width which, in turn, is inversely proportional to the one-third power of the concentration gradient at the junction. Thus, in order to reach the current density corresponding to the total current $I_H$ through the area of the junction $J_{C2}$ which is smaller than the total middle junction area $J_{C1}$ and $J_{C2}$, one must reduce the total current to a value below $I_H$ to turn the device off.

Referring to FIGURES 3A–I, the steps in forming a device in accordance with the invention are illustrated. A slice of semiconductive material 31 of desired acceptor impurity concentration and thickness is formed by well known processes. For example, a silicon ingot having the desired acceptor impurity concentration is sliced and lapped to form slices of the desired thickness. The slice is then cleaned, such as by burning in an oxygen atmosphere at about 1300° C. for 10 to 15 minutes. This develops a silicon oxide film on the surface of the slice. The silicon oxide film is removed in a hydrofluoric acid solution. A donor impurity is predeposited on the surface. The predeposition may be carried out in a furnace having several temperature zones. The slice may be placed in a zone having a temperature of about 800° C. Phosphorus oxide is placed in another zone of the furnace having a lower temperature, for example 200° C. A carrier gas is caused to pass over the $P_2O_5$ into the relatively high temperature zone at a rate of between 150 and 250 cubic centimeters per minute in a typical size furnace. The temperature of the first or high temperature furnace is selected to give the desired four point probe or sheet resistance for the N-type layers. The temperature of the first furnace is dependent on the desired Q, the number of atoms of impurity per centimeter squared which it is desired to diffuse into the slice during prediffusion. The phosphorus prediffuses into the slice a distance indicated by the layer 32. FIGURE 3B. The penetration is controlled largely by the temperature of the high temperature zone and the period of time that the slice is in the furnace. During the prediffusion, a phosphorus silicon glass-like layer 33 is formed on the surface. Loose $P_2O_5$ (not shown) may be dispersed on the surface of this glass-like layer.

If the silicon slice is allowed to remain for thirty minutes in the high temperature zone at 800° C. with the $P_2O_5$ maintained at 230° C., the layer 32 is about 0.05 micron in thickness and the glass-like layer 33 is greater than about 0.1 micron.

The next step in the process is to mask the slice and wash one surface. The unmasked side of the slice is washed in hydrofluoric acid to remove the loose phosphorus and the phosphorus silicate glass-like layer 33 from the selected surface to provide a clean surface 34 (FIGURE 3C).

The slice is then placed in a furnace and subjected to a diffusion process at a suitable temperature, for example, 1300° C. The phosphorus impurity is diffused further into the slice to a depth which is dependent upon the time the slice is held in the furnace and the temperature of the furnace. The calculation of diffusion times and temperatures is well known in the art. The resulting device is shown in FIGURE 3D.

By removing the glass-like layer on the surface 34, the final thickness of the resulting upper N-type layer 36 is less than the thickness of the lower N-type layer 37. The lower N-type layer has a constant phosphorus surface concentration or infinite phosphorus source from the glass-like layer 33 during the high temperature diffusion step. The upper N-type layer has only a small constant phosphorus source from the prediffused N-type layer 32. Consequently, the impurity concentration of the N-type layer 36 is less than the impurity concentration in the lower N-type layer 37.

The slice includes adjacent layers 36, 37 and 38 forming a pair of junctions. The concentration gradient at the junction 39 may be less, equal or more than the concentration gradient at the junction 41 depending on the prediffusion and diffusion schedule due to the concentration dependence of the phosphorus impurity diffusion coefficient in silicon.

During the diffusion operation the glass-like layer on the lower portion of the slice becomes thicker. A silicon oxide layer is formed on the upper surface.

A step 42, FIGURE 3E, is formed on the upper surface. The step has a depth such that no N-type material or a relatively thin N-type region 43 remains at the bottom of the step. Preferably, for very thin slices this region is less than about three microns in thickness. A step of this type might be formed by mechanical operations such as grinding or lapping, or by chemical means such as etching. In the etching process the surface of the slice may be masked with suitable acid resist such as wax, and placed in an acid bath which etches away the upper oxide coating and the underlying N— region to the desired depth to form the step 42.

Wax, acid resist or the like is then removed from the surface of the slice. The upper surface is masked and a longitudinal strip of wax or other resistive material is applied. The slice is then washed in hydrofluoric acid to remove all of the oxide layer with the exception of the strip 44. A structure of the type shown in FIGURE 3F results.

The structure shown in FIGURE 3F is then placed in a furnace and a predeposition and diffusion operation in the presence of acceptors, for example a $B_2O_3$ atmosphere, is carried out in a temperature of approximately 1200° C. for a predetermined period of time. The boron is deposited and diffused into the upper surface of the slice; however, the boron is masked by the oxide strip 44 and the silicate glass-like coating 33. Two spaced P type regions 45 and 46 are formed. The regions are separated by the N— region which extends to the upper surface beneath the strip 44. It is seen that the separation of the P region is controlled by controlling the width of the silicon oxide strip 44 and the depth of diffusion of the boron into the slice. A boron silicate glass-like layer 47 is formed over all of the surfaces of the slice. The rising portion of the step 42, and the surface of the slice in the vicinity of the strip 44 are masked 48, and the slice is etched to remove all of the oxide and glass-like layers except for the portion under the mask 48.

The slice is then nickel plated, FIGURE 3I, to form ohmic contacts with the exposed surfaces, namely the P regions 45 and 46, and the N region 37. The ends of the slice are chemically removed to form a structure of the type shown in FIGURE 3I. Suitable terminal leads 51, 52 and 53 may then be connected to the ohmic contacts.

It is seen that the resulting structure is of the type shown and described with reference to FIGURE 1. The length D which controls the resistance between the two P layers may be controlled by controlling the width of the strip 44. The concentration gradients of the junctions $J_{C1}$ and $J_{C2}$ may be controlled by controlling the temperature and time during predeposition and diffusion of phosphor and boron.

The edge of the junction $J_{C1}$ on the surface is covered by the oxide layer and is, therefore, relatively immune to surface conditions which might effect its breakdown characteristics.

The following example of the process as actually carried out will serve to illustrate the steps in forming a device in accordance with the invention.

Starting slice:
- Thickness ____________ 42±1 micron.
- Resistivity ____________ 0.47 ohm-cm.
- Surfaces ____________ Lapped with 1950 grit SiC.
- Material ____________ Silicon.

Cleaning:
- Burn in $O_2$ atmosphere at approx. 1300° C. for 10–15 minutes.
- Dissolve $SiO_2$ in hydrofluoric acid.

Predisposition of $P_2O_5$:
- High temp. zone (slice) ____________ 803° C.
- Low temp. zone ($P_2O_5$) ____________ 211° C.
- Time ____________ 0.50 hour.
- Four point probe resistance ____________ 30±2 ohms.

Removal of $SiO_2$ and $P_2O_5$ glass from one surface:
- Apply wax mask.
- Wash in hydrofluoric acid 20 minutes.

Diffusion of donors:
- Temperature ____________ 1300° C.
- Time ____________ 1.5 hours.
- *V/I* ____________ 0.24±0.04 ohm-cm. ($n+$), 4.2±0.3 ohm-cm. ($n-$).

Etch step:
- Wax mask.
- Etch in concentrated $HNO_3$ with 10% by volume of concentrated hydrofluoric acid for 80 seconds.

Remove $SiO_2$ and $P_2O_5$ glass to form strip:
- Wax mask.
- Wash in hydrofluoric acid 3 minutes.

Diffusion of acceptors ($B_2O_3$):
- High temperature zone ____________ 1200° C.
- Time ____________ 30 minutes.
- Carrier gas ____________ $N_2$.
- Four point probe resistance ____________ 0.66±0.02 ohm.

Remove $B_2O_3$ glass, $P_2O_5$ glass, $SiO_3$:
- Wax mask.
- Wash in hydrofluoric acid 5 minutes.

Ohmic contacts:
- Nickel plate.
- Apply and solder or alloy contacts.

Etch off ends with CP–8 etch.

A device was formed having an overall thickness of 42 microns with step of 8 microns. The thickness of the layers was as follows:

| | Microns |
|---|---|
| N | 17.2±0.7 |
| P– | 13.0±1.1 |
| N– | 6.8±0.4 |
| P | 4.1±0.05 |

The voltage-current characteristics were as follows:

| | |
|---|---|
| $V_B$ | 7.4 volts. |
| $I_H$ | 2.9 ma. |
| R | 200 ohm (line **21**, FIGURE 2). |

The same device without built-in diode would have a breakdown voltage $V_B$=50 volts.

A two terminal four layer device is illustrated in FIGURE 4. By suitably masking during the last steps of the process, the step 42 is protected from the nickel plate by the silicon oxide.

A two terminal two layer device is shown in FIGURE 5. The concentration gradient at the junction can be controlled to give the desired breakdown voltage characteristics. A high concentration gradient junction 54 is formed between the P layer 56 and the N layer 57. A low concentration gradient junction is formed between the N layer 57 and the P– layer 58. The lower surface includes a P layer 59 for providing better ohmic contact.

FIGURE 6 shows the device of FIGURE 1 in a perspective. It is seen that the device, as shown, is a rectangular wafer having a step.

A device similar to that of FIGURE 6 but symmetrical about a line through its center is shown in FIGURE 7. The device illustrated is a two terminal device. FIGURE 8 shows another configuration symmetrical about a line.

FIGURE 9 shows a device similar to that shown in FIGURE 1 but which is symmetrical about an axis. FIGURE 10 is a sectional view of the device shown in FIGURE 9. It is to be noted in the device of FIGURES 9 and 10 that the oxide layer 44 completely protects the ends of the high voltage junction so that no part of the junction is exposed to ambient conditions.

Thus, it is seen that semiconductive devices having predetermined voltage current characteristics are provided. Improved two and four layer diodes having predetermined low breakdown voltages are provided. The oxide coating formed during diffusion is employed to protect the junctions of the device against the surrounds and ambient conditions.

I claim:

1. A four layer semiconductive device including a wafer of semiconductive material having first and second spaced faces comprising a first region of one conductivity type extending to the first surface, a second region of opposite conductivity type forming a junction with said first region and extending to the second surface, said second region including a portion having a higher impurity concentration of said opposite conductivity type than the remainder of said second region and extending to the second surface, a third region of said one conductivity type forming a junction with the second region including the portion of higher impurity concentration, said third region defining a surface on said second surface in common with the surface of the second region, a fourth region of opposite conductivity type inset into the third region forming a junction with said third region, said fourth region defining a surface on said second surface in common with the surfaces of the second and the third regions, the end of the junctions between said second and fourth regions and the third region extending to said one surface.

2. A device as in claim 1 wherein an oxide layer formed before the formation of junctions between the second and the fourth regions and the third region covers the end of the junctions.

References Cited in the file of this patent

UNITED STATES PATENTS

| | | |
|---|---|---|
| 2,816,850 | Haring | Dec. 17, 1957 |
| 2,819,990 | Fuller et al. | Jan. 14, 1958 |
| 2,861,018 | Fuller et al. | Nov. 18, 1958 |
| 2,879,190 | Logan et al. | Mar. 24, 1959 |
| 2,890,142 | Kroger et al. | June 9, 1959 |
| 2,899,344 | Atalla et al. | Aug. 11, 1959 |
| 2,911,539 | Tanenbaum | Nov. 3, 1959 |
| 2,915,647 | Ebers et al. | Dec. 1, 1959 |
| 2,930,722 | Ligenza | Mar. 29, 1960 |
| 2,954,307 | Shockley | Sept. 27, 1960 |
| 2,959,504 | Ross et al. | Nov. 8, 1960 |
| 2,980,830 | Shockley | Apr. 18, 1961 |
| 3,079,512 | Rutz | Feb. 26, 1963 |

OTHER REFERENCES

Journal of the Electrochemical Society, May 1959, Aschner et al., relied on; pages 415–417.